United States Patent
Fruehauf et al.

(10) Patent No.: US 6,590,981 B2
(45) Date of Patent: *Jul. 8, 2003

(54) SYSTEM AND METHOD FOR SECURE CRYPTOGRAPHIC COMMUNICATIONS

(75) Inventors: Hugo Fruehauf, Laguna Niguel, CA (US); Derek C. Au, Huntington Beach, CA (US)

(73) Assignee: Zyfer, Inc., Anaheim, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/510,540

(22) Filed: Feb. 22, 2000

(65) Prior Publication Data

US 2002/0006202 A1 Jan. 17, 2002

(51) Int. Cl.[7] ................................................. H04L 9/08
(52) U.S. Cl. ....................... 380/260; 380/273; 380/277; 380/47
(58) Field of Search ................................ 380/262, 273, 380/277, 260, 47

(56) References Cited

U.S. PATENT DOCUMENTS

| | | | | |
|---|---|---|---|---|
| 3,700,806 A | * | 10/1972 | Vasseur | 331/78 |
| 4,079,195 A | * | 3/1978 | Frutiger | 375/367 |
| 4,484,025 A | | 11/1984 | Ostermann et al. | |
| 4,596,898 A | | 6/1986 | Pemmaraju | |
| 4,790,012 A | | 12/1988 | Sutphin, Jr. | |
| 4,807,139 A | * | 2/1989 | Liechti | |
| 4,893,339 A | | 1/1990 | Bright et al. | |
| 4,935,961 A | * | 6/1990 | Gargiulo et al. | 380/260 |
| 4,956,863 A | * | 9/1990 | Goss | 380/30 |
| 5,058,158 A | * | 10/1991 | Matias et al. | |
| 5,237,615 A | * | 8/1993 | Snow | 380/47 |
| 5,253,294 A | * | 10/1993 | Maurer | 380/21 |
| 5,341,427 A | | 8/1994 | Hardy et al. | |
| 5,349,642 A | | 9/1994 | Kingdon | |
| 5,365,225 A | * | 11/1994 | Bachhuber | 11/94 |
| 5,404,403 A | * | 4/1995 | Bright et al. | 380/21 |
| 5,412,722 A | * | 5/1995 | Sherly et al. | 380/21 |
| 5,412,730 A | * | 5/1995 | Jones | 380/46 |

(List continued on next page.)

OTHER PUBLICATIONS

RSA Security, "US WEST Becomes RSA Security's Five Millionth RSA SecurID Technology User," http://www.rsasecurity.com/news/pr/991202.html[internet], Dec. 1999.*

RSA Security, "Security Dynamics Introduces SecurID Modem," http://www.rsasecurity.com/news/pr/960401–2.html[internet], Apr. 1996.*

Primary Examiner—Gilberto Barrón
Assistant Examiner—Paul E. Callahan
(74) Attorney, Agent, or Firm—Morrison & Foerster LLP

(57) ABSTRACT

An apparatus and method for secure cryptographic communications between a sender and a receiver or multiple receivers that includes first and second timing elements, and first and second key storage units containing multiple keys in a predetermined order for selection depending on respective key times, where the key times occur periodically according to the first and second timing elements, respectively. A data encryptor obtains a new key from the first key storage unit at each occurrence of the key time of the first key storage unit, and uses the key to encrypt an inputted data. And, at least one data decryptor obtains a new key from the second key storage unit at each occurrence of the key time of the second key storage unit. Time synchronization of the participants' equipment provides the method of selecting compatible keys for the encryption and decryption process. This approach not only selects the compatible keys at the sending and receiving ends but also serves to change keys on a regular basis to enhance the overall security of the system.

50 Claims, 3 Drawing Sheets

U.S. PATENT DOCUMENTS

| | | |
|---|---|---|
| 5,440,635 A | 8/1995 | Bellovin et al. |
| 5,491,749 A | 2/1996 | Rogaway |
| 5,592,553 A | 1/1997 | Guski et al. |
| 5,604,806 A | 2/1997 | Hassan et al. |
| 5,659,618 A | 8/1997 | Takahashi et al. |
| 5,661,807 A | 8/1997 | Guski et al. |
| 5,686,904 A * | 11/1997 | Bruwer |
| 5,699,430 A | 12/1997 | Krizay et al. |
| 5,703,948 A * | 12/1997 | Yanovsky .................... 380/21 |
| 5,748,734 A * | 5/1998 | Mizikovsky |
| 5,757,916 A | 5/1998 | MacDoran et al. |
| 5,796,833 A * | 8/1998 | Chen et al. .................... 380/25 |
| 5,825,300 A * | 10/1998 | Bathrick et al. ....... 340/825.33 |
| 5,850,444 A * | 12/1998 | Rune |
| 5,870,477 A | 2/1999 | Sasaki et al. |
| 5,889,865 A * | 3/1999 | Vanstone et al. ............. 380/25 |
| 5,987,130 A | 11/1999 | Chang |

* cited by examiner

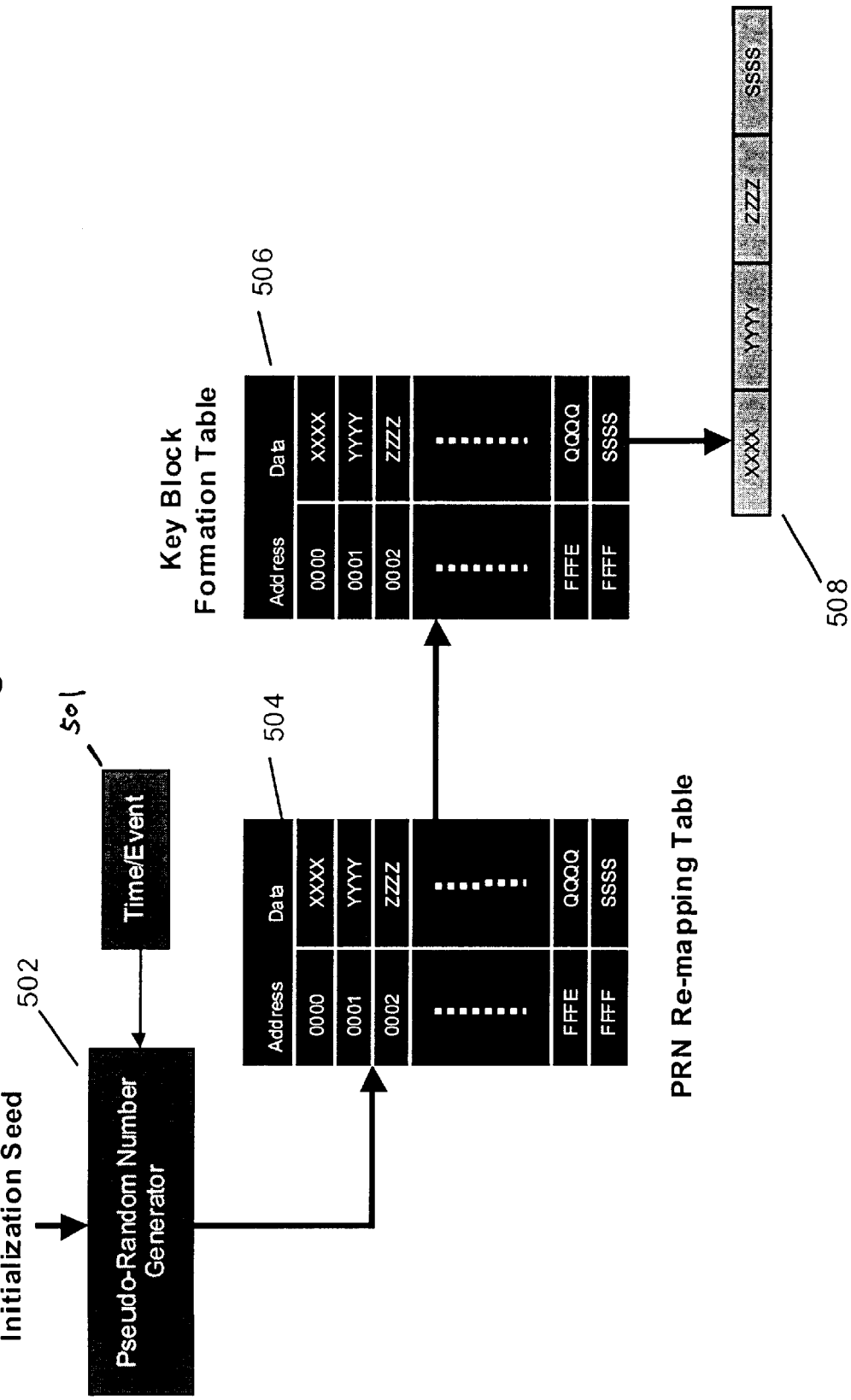

SYSTEM AND METHOD FOR SECURE CRYPTOGRAPHIC COMMUNICATIONS

BACKGROUND OF THE INVENTION

1. Field of the Invention

The present invention relates to an apparatus and method for increasing the security of electronic communications while reducing the logistics involved. More specifically, the preferred embodiments of the present invention relate to a security infrastructure involving electronic cryptographic communications.

2. Description of Related Art

Electronic cryptography involves the use of encryption and decryption keys to render the information transmitted to be undecipherable for unintended recipients. It is hoped only the authorized recipient, being in possession of the required decryption key, will be able to decipher the data that is sent.

However, such a system may be breached if an unauthorized party has knowledge of the cryptographic keys. This can occur through unintentional disclosure or by breaking of the code by a "hacker". Conventional systems attempt to decrease the likelihood of a security breach by using longer encryption key codes and better management of the key infrastructure. Nevertheless, even systems using longer encryption key codes are susceptible to breach by a hacker, especially in today's world of powerful computers. Further, management of the key infrastructure increases logistics and maintenance costs, and may create opportunities for unintended disclosure of cryptographic keys.

SUMMARY OF THE INVENTION

To overcome the problems described above, preferred embodiments of the present invention provide apparatuses and methods for the secure transmission of encrypted data where the likelihood of interception of the keys by a hacker as well as the costs of maintaining a robust security system are greatly diminished.

A preferred embodiment of the present invention includes first and second timing elements, and first and second key storage units containing a plurality of keys in a predetermined order for selection of keys depending on respective key times, wherein the key times occur periodically according to the first and second timing elements, respectively. A data encryptor obtains a new key from the first key storage unit at each occurrence of a key time of the first key storage unit. The data encryptor holds the key for a key period and uses the key to encrypt the data inputted during the key period. Also, at least one data decryptor is provided with a data decryptor obtaining a new key from the second key storage unit at each occurrence of a key time of the second key storage unit. The data decryptor uses the key for a key period to decrypt the encrypted data.

Another preferred embodiment of the present invention includes at least two data decryptors. The first data decryptor has a current key period, and the second data decryptor has a key period preceding or succeeding the current key period. The data decryptors each hold a key that corresponds to their respective key periods at substantially the same time such that one of those keys matches the key used to encrypt the received encrypted data.

Another preferred embodiment of the present invention includes at least three data decryptors. The second data decryptor has a current key period, the first data decryptor has a key period preceding the current key period, and the third data decryptor has a key period succeeding the current key period. The data decryptors each hold a key that corresponds to their respective key periods at substantially the same time such that one of those keys matches the key used to encrypt the received encrypted data.

In another preferred embodiment of the present invention, a method for secure cryptographic communications between a sender location and a receiver location is provided which method includes providing first and second timing signals at sender and receiver locations, respectively. Also included is providing a first and second plurality of keys in a predetermined order, and providing a plurality of key times periodically according to said first and second timing signals, respectively. For encryption, the method involves obtaining a new key from said first plurality of keys at each occurrence of the key times, holding the key for a key period, and using the key to encrypt data inputted during said key period. For decryption, the method involves obtaining a new key from the second plurality of keys at each occurrence of the key times, holding the key for a key period, and decrypting the encrypted data with the key.

In preferred embodiments of the present invention, the system stores and/or generates in real-time a multitude of encryption keys in the crypto portion of the hardware supplied to an authorized user community. These keys, symmetric or asymmetric in structure, are preferably not known to any of the users. This solves one of the most pervasive causes of security breaches—the unintentional disclosure of an encryption key. These stored and/or generated encryption keys are preferably time synchronized in the hardware of the authorized user community so that the key used to encrypt data at the sending end is the same key that decrypts the data at the receiving end(s).

The preferred embodiments of the present invention provides several advantages. First, in one preferred embodiment, no key is transferred across the communication media, whether sent by courier, sent electronically in the clear or sent via cryptographic means. Thus, keys cannot be intercepted in such an embodiment. Second, by time synchronizing the authorized user community, the infrastructure is provided to regularly change the keys. System robustness is maintained over a wide range of key periodicity. A practical range for key change is days to nanoseconds. Frequency of key change is influenced by the level of security desired and the accuracy of time synchronization. The more frequent the key change, the higher the security level. Thus, changing keys creates an extremely high entry barrier for the hacker. Thus in preferred embodiments, the keys are changed preferably faster than the state-of-the-art of computing power that a hacker could apply to decipher the keys.

Due to the simplicity of the key infrastructure described, no key manager is required in the user community, which significantly reduces logistics costs and chances for security breaches. Transmission speed is inherently increased since no bandwidth is wasted on key transfer and authentication. Also, the preferred embodiments of the present invention allow for the utilization of different cryptographic algorithms since key management is independent of encryption algorithms.

Other advantages of the preferred embodiments of the present invention include that the encryption keys are unknown to anyone in the authorized user community, hence no unintentional disclosure can occur. At the same time, no "public" or "private user community" database exists for keys or any portions of keys, hence this significantly hinders any access to information relating to the keys or their infrastructure. In one preferred embodiment, no third-party Key Authenticators or Certifiers (CAs Certificate Authorities) are required since the preferred embodiment eliminates substantially the possibility of spoofing an unknown key.

Other important improvements over conventional systems include being able to support numerous cryptographic algorithms, both symmetric and asymmetric. At the same time, architecture using multiple key generation blocks can be used to support PKI like functions. Tiered access and separate levels of security and access within a user community are also possible in one preferred embodiment. Furthermore, the key management scheme of the preferred embodiments is suitable for point to point as well as broadcast communications. And, finally, multiple seed inputs and the resultant remap of information assures against spoofing of the crypto modules of one piece of key data.

Other features, elements, and advantages of the present invention will be described in detail below with reference to preferred embodiments of the present invention and the attached drawings.

BRIEF DESCRIPTION OF THE ATTACHED DRAWINGS

The present invention will become more fully understood from the detailed description given herein below. The accompanying drawings are given by way of illustration only, and do not limit the present invention and wherein:

FIG. 2 is a block diagram illustrating how keys are generated in a preferred embodiment of the present invention.

DETAILED DESCRIPTION OF PREFERRED EMBODIMENTS

Figure 1:
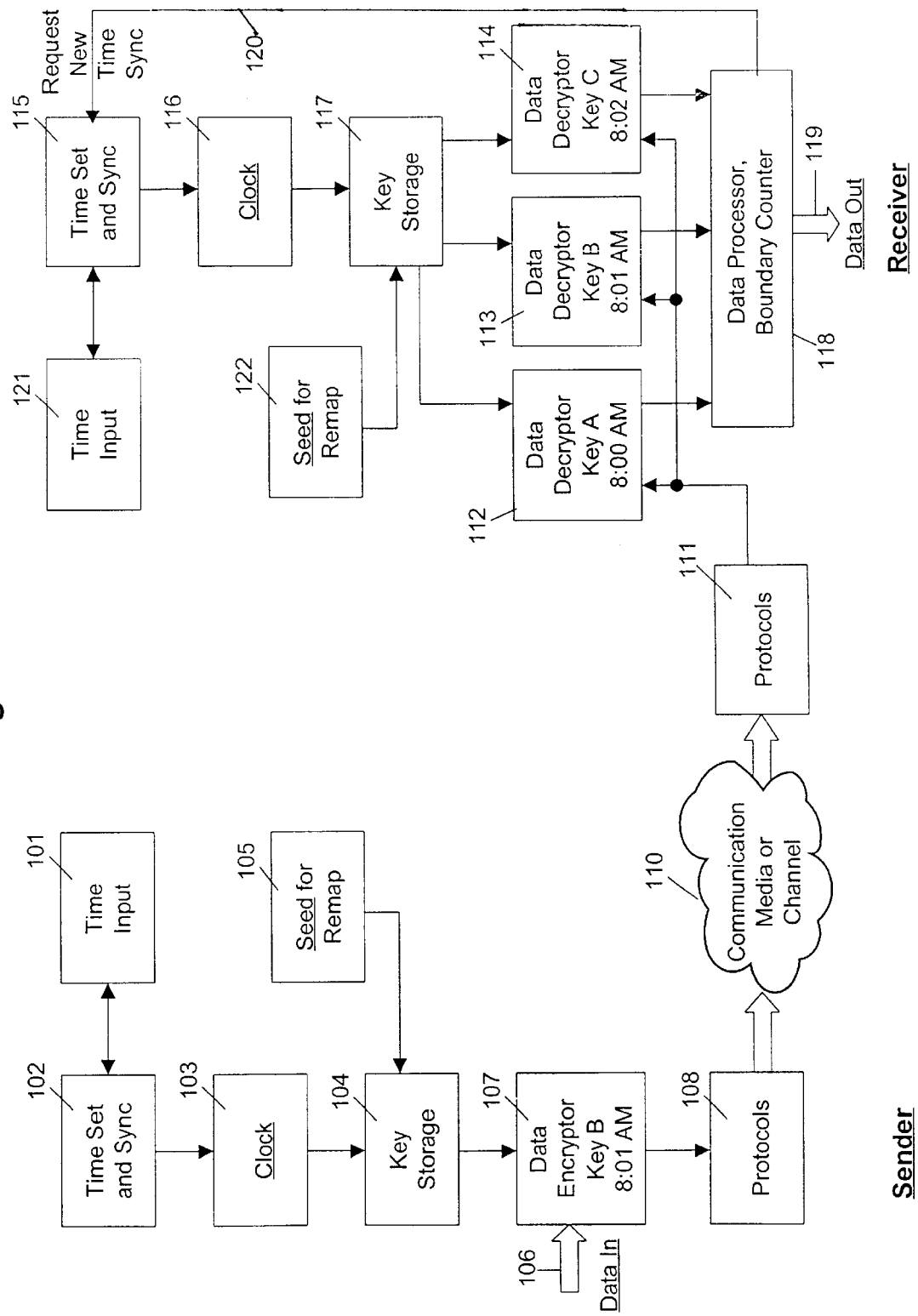
FIG. 1 is a block diagram of a cryptographic apparatus including three parallel decryptors according to a preferred embodiment of the present invention.

FIG. 1 is a block diagram of a cryptographic apparatus including three parallel data decryptors according to a preferred embodiment of the present invention. Referring to FIG. 1, a reference time is input to the time input unit 101 and 121 of the crypto hardware that is supplied to the authorized user community. The reference time is preferably Universal Coordinated Time (UTC), which is available worldwide from various sources. The present invention functions equally well with other "world-time" references, or with "relative-time." A time reference can be obtained from one or more of the following sources, but is not limited to those described below:

1) Internet Network Time—Time extracted from the communication Internet network using the Network Timing Protocol (NTP) which works in conjunction with servers located throughout the world.
2) Telecom Network Time—Using Stratum clocks to maintain time after an initial time calibration.
3) Telephone Dial-up Time—Extracting time from services provided by national or international standards labs.
4) Clocks Synchronized through Power Utilities—Quartz or atomic oscillators, which after initial time calibration, are synchronized through public utility AC power.
5) WWVB/LF—Time Signals from USA's ground based WWVB time service and other international LF services for the same purpose.
6) CDMA/PCS—Time extracted from the telecom service providing CDMA and CDMA/PCS cell phone service.
7) Precision Oscillators—Quartz or atomic oscillators, which after initial time calibration, maintain time for a specified period.
8) GPS/WAAS—Time received from satellite based military and civil navigation systems such as the Global Positioning System and the differential GPS aided WAAS/EGNOS/MSAS satellite signals and other national and international satellite timing signals.
9) Other timing sources that are available or will become available.

The reference time is processed in the time input units 101 and 121, where it can be monitored and periodically resynchronized with the aid of a time set and sync unit 102 and 115, respectively. The output of the time input unit 101 and 121 forms the clocks 103 and 116, respectively, which synchronizes the crypto hardware described below.

The specific key for any particular time period is determined at the time of initialization of the system by the seed for remap units 105 and 122, which orders the key selection process for all of the synchronized hardware in the authorized user community. Each individual user community may preferably choose its own unique key map by preferably selecting a unique seed for the seed for remap units 105 and 122.

Referring to FIG. 2, a block diagram illustrating how keys are generated in a preferred embodiment of the present invention is shown. A user furnishes preferably a 96 bit initialization seed to the re-map units 105 and 122. The re-map units 105 and 122 preferably include a pseudo-random (PRN) generator 502, which generates numbers according to the initialization seed and a re-mapping table 504. A suitable PRN generator is preferably comprised of two 96-bit linear feedback shift registers ("LFSR") connected in a Bi-lateral Stop and Go configuration.

A pseudo-random 16 bit number is preferably provided by the PRN generator 502 and used as an address to access the PRN re-mapping table 504. The PRN re-mapping table 504 preferably contains $2^{16}$ unique entries of 16 bit numbers preferably in the range of 0000 to FFFF hexadecimal. Note that the entries in the table 504 are preferably randomly ordered. Data from the table 504 is preferably used as an address to access the key storage unit's key block formation table 506. The key block formation table 506 also preferably contains $2^{16}$ entries of 16 bit numbers preferably in the range of 0000 to FFFF hexadecimal. These numbers are not necessarily unique since they are chosen to avoid weak key formation for the associated cryptographic algorithm. The entries are preferably randomly ordered within the table 506. The resulting 16 bit numbers 508 from the key block formation table 506 are preferably concatenated to form the key used by the cryptographic algorithm. In the case of the 3DES algorithm, 4 numbers are preferably concatenated to form a 64 bit key. The process is preferably repeated to form the second key required for 3DES. Note that in other embodiments, the seed for re-map units and the key storage units may not utilize a PRN generator, but instead include a table of keys synchronized to a timing mechanism. In such an embodiment, both the receiving side and the sending side will share an identical table of keys.

Referring back to FIG. 1, the data encryptor 107 and the data decryptors 112–114 obtain a key from the key storage units 104 and 117, respectively, which generate keys based on the time data in clocks 103 and 116 ("key time"). After initially obtaining a key, periodic key changes are performed by the data encryptor 107 and the data decryptors 112–114 by obtaining a new key from the key storage units 104 and 117, respectively. The key storage units 104 and 117 assign a new key to the data encryptor 107 and the data decryptors 112–114, respectively, at each key time according to the clocks 103 and 116, respectively. The data encryptor 107 and the data decryptors 112–114 hold the same key until another key time occurs ("key period") according to the clocks 103 and 116, respectively. The length of the key period is variable and is preferably a function of the user's security level requirements and the long-term accuracy of the clocks 103 and 116. The length of the key period may be set at a range from several days to nanoseconds if the timing mechanisms in the system are sufficiently accurate to maintain sychronization.

Note that the data encryptor 107 and data decryptors 112–114 may be hardware implementations of well known and well studied encryption algorithms. These algorithms are typically of the symmetric key type but the functionality of the synchronization system can be used to support both symmetric and asymmetric key systems. The hardware architecture preferably uses parallel processing and pipelining techniques to support extremely fast data transfers. A preferred embodiment of the present invention uses the 3DES, two key encryption and decryption algorithms but the present invention is not limited to this particular algorithm. Any of a number of cryptographic algorithms may be used to implement encryption and decryption.

During the encryption process, unencrypted data 106 ("red data") is input to the data encryptor 107. The data encryptor 107 holds a key obtained from the key storage unit 104 and encrypts the red data 106 with the key during the key period. For example, referring to FIG. 1A, the consecutive use of three different keys, keys A, B, and C is illustrated. If the key period is set to be one minute, and if the clock 103 is at a time of about 8:01 AM, then the data encryptor 107 obtains a key B from the key storage unit 104 and holds key B for one minute. During this one minute, if the red data 106 is input to the data encryptor 107, then the data encryptor 107 encrypts the red data 106 with key B. However, in the present example, if the time on the Clock 103 is showing 8:02 AM, then the data encryptor 107 obtains key C from the key storage unit 104 and then encrypts with key C the inputted data. Note that for the purposes of explaining the present invention, arbitrary times of 8:00 AM, 8:01 AM, and 8:02 AM have been selected with a key period of one minute. As previously mentioned, the key period can be any length of time.

In FIG. 1, the encrypted data ("black data") passes through protocols 108 and is then released into the communications media or channel 110 for delivery to the intended receiver. The black data is received and preferably passes through the applicable protocols 111 and is received by all three data decryptors 112–114 preferably at about the same time. In the present example, since the clock 116 is showing 8:01 AM, the data decryptor 113 is expected to decrypt the black data since the data decryptor 113 is synchronized to the current key period showing on the clock 116. The current key period ranges from approximately 8:01:00 AM to approximately 8:01:59 AM. The data decryptor 112 is synchronized to the preceding key period of the clock 116, which in the present example ranges from approximately 8:00:00 AM to approximately 8:00:59 AM. The data decryptor 114 is synchronized to the succeeding key period of the clock 116, which in the present example ranges from approximately 8:02:00 AM to approximately 8:02:59 AM.

Note that in the preferred embodiment of FIG. 1, all three data decryptors 112–114 hold their respective keys at the same time. In other words, when the clock 116 is showing 8:01:00 AM to 8:01:59 AM, the data decryptors hold keys A–C all at the same time, respectively. It is thus arranged because in the present preferred embodiment, it is possible that the clocks 103 and 116 at the sending and receiving ends do not remain in perfect synchronization. This means that the clock 116 could be leading or trailing the clock 103. For this reason, key A, which is selected for the key period preceding the current key period, is assigned to the data decryptor 112, and key C, which is selected for the key period succeeding the current key period, is assigned to the data decryptor 114.

Hence, if the clock 116 is trailing the clock 103 showing 8:01:30 AM by 40 seconds, then at the time that the data decryptors 112–114 receive the black data the clock 116 may be showing 8:00:50 AM. If this is the case, then the data decryptor 114 has the same key as the key used to encrypt the black data since the data decryptor 114 is synchronized to use the key corresponding to the key period succeeding the current key period. In contrast, if the clock 116 is leading the clock 103 showing 8:01:30 AM by 40 seconds, then at the time that the data decryptors 112–114 receive the black data the clock 116 may be showing 8:02:10 AM. If this is the case, then the data decryptor 112 has the same key as the key used to encrypt the black data since the data decryptor 112 is synchronized to use the key corresponding to the key period preceding the current key period.

Figure 1A:
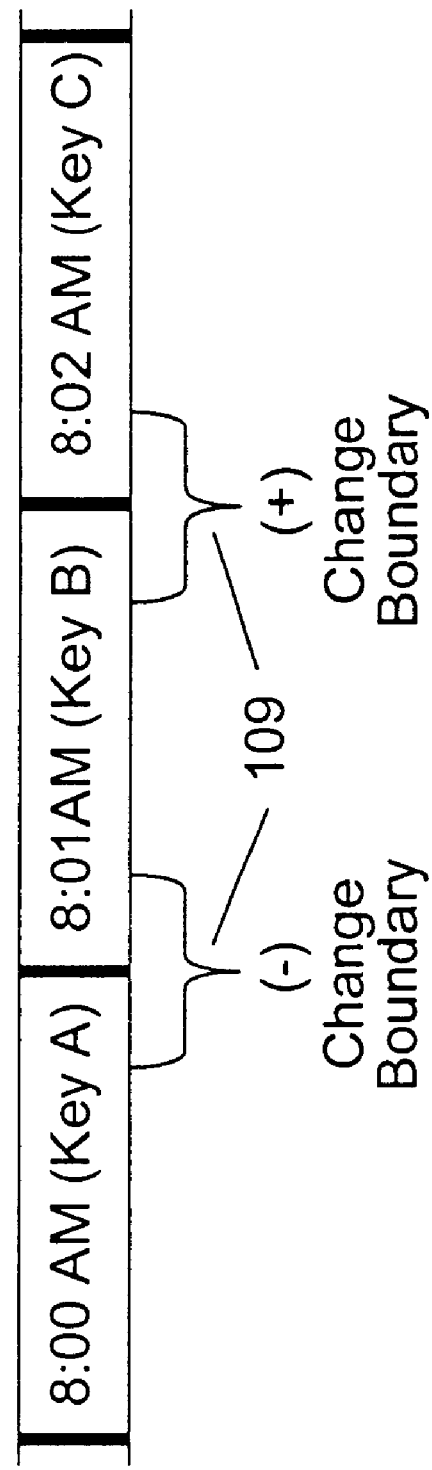
FIG. 1A illustrates time synchronization of the data decryptors of FIG. 1.

Thus, by using three data decryptors 112–114 in preferably a parallel configuration, the system can be used to eliminate interruptions or loss of data resulting from out-of-sync key changes, delays in the communication media, or loss of data-packets that may be in transit during a key transition boundary. In other words, the three data decryptors 112–114 cover out-of-sync conditions whether the data decryptors receive black data that crosses the (−) or the (+) time boundaries 109, as shown in FIG. 1A.

The processing unit 118 preferably serves at least two functions. The processing unit 118 processes the decrypted data to the data out 119 of the receiver and it calculates a time difference between the clock 116 for all practical purposes and the clock 103. More particularly, only one of the three parallel decryptors 112–114, for instance decryptor 113, is expected to be decrypting the data at any given time; when a transition from one data decryptor to another data decryptor occurs, it means that the data decryptors 112, 113, and 114 have changed keys while the black data received is still encrypted with the old key, or that the received data has switched key while the decryptors have not. Hence, the processing unit 118 measures the + or − offset of the incoming signal with its own clock 116 at the time of transition. When that difference exceeds a predetermined limit, for example, 10 seconds, the processing unit 118 raises a flag 120 requesting new time synchronization. The flag 120 will indicate that either the clock 103 or the clock 116 is off by more than a specified offset limit. Once the flag 120 is raised, the receiver is alerted to check its clock 116 against the reference clock and resynchronize the clock 116.

For time inputs from network and external sources, time synchronization and resynchronization is done automatically and is transparent to the users. In the case of self-contained oscillators providing the time source, an initial calibration is implemented, with oscillators maintaining sync for years and decades, depending on the robustness of the oscillator selected. The time accuracy that must be maintained as it relates to the present preferred embodiment is approximately equal to the frequency of key changes. That is, if keys are changed about every minute, time synchronization accuracy must be within about one minute, including all transport delays.

In other preferred embodiments, the present invention may have one data decryptor, two data decrytors or four or more data decryptors, and is not limited to the three data decryptor configuration shown in FIG. 1. However, if less than three data decryptors are used, it is preferable that the data decryptor(s) have a greater synchronization accuracy so as to avoid erros caused by untimely key transitions. If only one data decryptor is provided, it is also preferable to provide a data storage media.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for secure cryptographic communications between a sender location and a receiver location, the apparatus comprising:
   first and second timing elements at said sender and receiver locations, respectively;
   first and second key generator units at said sender and receiver locations, respectively, each generating a plurality of keys;
   a data encryptor, said data encryptor obtaining a key from said first key generator unit at an occurrence of a key time, and said data encryptor using said key to encrypt data inputted during a key period; and
   a data decryptor, wherein said data decryptor obtains keys from said second key generator unit at different key times, and wherein said data decryptor concurrently employ a plurality of keys obtained from said second key generator unit to decrypt the received encrypted data.

2. The apparatus of claim 1, wherein said data decryptor includes three decrypting sections.

3. The apparatus of claim 2, wherein said three decrypting sections are physically distinct from each other.

4. The apparatus of claim 2, wherein each of said data decrypting sections receive said encrypted data at the same time.

5. The apparatus of claim 2, wherein said data decrypting sections obtain keys at successive periodic key times.

6. The apparatus of claim 2, wherein each of said data decrypting sections uses keys that are different from each other.

7. The apparatus of claim 2, further comprising a processing unit operatively coupled to said data decryptor, wherein said processing unit receives said decrypted data from at least one of said data decrypting sections.

8. The apparatus of claim 1, wherein said key period is settable by a user.

9. The apparatus of claim 1, wherein said first and second timing elements are synchronized.

10. The apparatus of claim 1, wherein corresponding key times of said first and second key generator units occur at a same time.

11. A method for secure cryptographic communications between a sender location and a receiver location, the method comprising:
    providing first and second timing signals at sender and receiver locations, respectively;
    in accordance with the first and second key time signals, respectively generating a first and second set of plurality of keys, the values of which are changed periodically according to a key period, wherein said first set of plurality of keys are generated at the sender location and said second set of plurality of keys are generated at the receiver location and the key values are separately generated at each location;
    obtaining an encryption key from said first set of plurality of keys and using said encryption key to encrypt data; and
    obtaining a plurality of decryption keys from said second set of plurality of keys; and
    while applying said plurality of decryption keys, decrypting said encrypted data with one of said plurality of decryption keys.

12. The method of claim 11, wherein said plurality of decryption keys are obtained at successive second key time signals.

13. The method of claim 11, wherein said first and second set of plurality of keys are generated in a pseudo-random manner.

14. The method of claim 11, wherein said plurality of decryption keys are applied to the encrypted data concurrently.

15. The method of claim 11, further comprising the step of monitoring the synchronization of said first and second timing signals.

16. The method of claim 11, further comprising the step of selectably setting said key period to a specific length of time.

17. The method of claim 11, further comprising the step of synchronizing said first and second timing signals.

18. An apparatus for decrypting encrypted data, said apparatus comprising:
    a timing element;
    a key generator unit autonomously generating keys in sequence upon occurrences of key times, wherein the key times occur periodically as indicated by the timing element; and
    a data decryptor, wherein said data decryptor obtains keys from said second key generator unit at different key times, and wherein said data decryptor concurrently employ a plurality of keys obtained from said second key generator unit to decrypt the received encrypted data.

19. The apparatus of claim 18, wherein said data decryptor includes three data decrypting sections.

20. The apparatus of claim 19, wherein said data decrypting sections are physically distinct from each other.

21. A method for decrypting encrypted data at a receiver location, said method comprising the steps of:
    providing a timing signal;
    autonomously generating a plurality of keys in sequence at the receiver location without communication with any source of encrypted data to be sent to the receiver location;
    providing a plurality of key times periodically; and
    employing at least two of said plurality of keys at each occurrence of said plurality of key times to decrypt the encrypted data, wherein one of said at least two of said plurality of keys is the appropriate key for decrypting the encrypted data.

22. The method of claim 21, wherein said at least two of said plurality of keys are successively generated.

23. The method of claim 21, wherein said plurality of keys are generated in a pseudo-random manner.

24. An apparatus for receiving and decrypting encrypted data, said apparatus comprising:

a timing element;

a key generator that automatically and autonomously generates a plurality of keys in sequence following an initial key, wherein each key is generated at the start of a respective key period, wherein said respective key periods occur periodically; and a data decryptor for decrypting data using at least two keys from said plurality of keys, said at least two keys including a current-key-period decryption key and an adjacent-key-period decryption key, wherein only one of said current-key-period decryption key and said adjacent-key-period decryption key decrypts the encrypted data during a key period; and a data processor operatively coupled to said data decryptor for detecting a key-switching event wherein, during a key period, said one of said current-key-period decryption key and said adjacent-key-period decryption key ceases to decrypt the encrypted data, and the other one of said current-key-period decryption key and said adjacent-key-period decryption key begins to decrypt the encrypted data, wherein said detection is used to monitor the synchronization between the timing element and another timing element located outside of the apparatus.

25. The apparatus of claim 24, wherein said key generator generates keys in a pseudo-random manner.

26. The apparatus of claim 24, wherein said key periods occur in accordance with a timing signal provided by said timing element.

27. The apparatus of claim 24, wherein said data processor monitors the synchronization between said timing element and said another timing element by measuring the time period between said key-switching event and the start of the next key period, and by comparing the measured time period with a predetermined offset limit period.

28. The apparatus of claim 27, wherein if said measured time period is greater than said predetermined offset limit period, said data processor generates a flag signal, said flag signal used to cause said timing element and said other timing element to synchronize.

29. A method of cryptographic communication at a receiving location comprising the steps of:

receiving data;

receiving a timing signal;

generating a plurality of cryptographic keys in sequence following an initial key, said keys being autonomously generated in a pseudo-random manner;

receiving a new generated cryptographic key in sequence at key change times determined by the timing signal; and decrypting data using at least two keys from said plurality of cryptographic keys, said at least two keys including a current-key-period decryption key and an adjacent-key-period decryption key, wherein only one of said current-key-period decryption key and said adjacent-key-period decryption key decrypts the encrypted data during a key period.

30. The apparatus of claim 29, further comprising the step of generating a flag signal in response to an event wherein, in between key change times, said one of said current-key-period decryption key and said adjacent-key-period decryption key ceases to decrypt the encrypted data, and the other one of said current-key-period decryption key and said adjacent-key-period decryption key begins to decrypt the encrypted data.

31. The apparatus of claim 1, wherein said key generator units generate said plurality of keys in a pseudo-random manner.

32. A system for secure cryptographic communication between a sender location and a receiver location, the system comprising:

first and second timing elements at said sender and receiver locations, respectively, for generating key change signals nominally at the same times;

first and second key generator units at said sender and receiver locations, respectively, wherein said first and second key generator units independently generate a first and second set of plurality of cryptographic keys in sequence without communication with one another, wherein said first and second set of plurality of cryptographic keys are generated in sequence in accordance with a first and second key change signals provided by said first and second timing elements, respectively;

a data encryptor for encrypting data using at least one key from the first set of plurality of cryptographic keys;

a data decryptor for decrypting data using at least two keys from the second set of plurality of cryptographic keys, said at least two keys including a current-key-period decryption key and an adjacent-key-period decryption key, wherein only one of said current-key-period decryption key and said adjacent-key-period decryption key decrypts the encrypted data between key change signals; and a data processor for generating a flag signal in response to an event wherein, in between key change signals, said one of said current-key-period decryption key and said adjacent-key-period decryption key ceases to decrypt the encrypted data, and the other one of said current-key-period decryption key and said adjacent-key-period decryption key begins to decrypt the encrypted data, wherein said flag signal is used to monitor the synchronization between the first and second timing elements.

33. The system for secure cryptographic communication of claim 32, wherein said first and second set of cryptographic keys are generated in a pseudo-random manner.

34. The system for secure cryptographic communication of claim 32, wherein, for a given time period, the key generated by said first key generator unit is identical to the key generated by said second key generator unit.

35. The system according to claim 32, wherein, in response to said flag signal from said data processor, the system causes said first and said second timing elements to synchronize.

36. A communications device for secure cryptographic communications with other communications devices comprising:

a key generation unit for autonomously generating plural key values in sequence at nominal key change points in time based upon provided initialization data, the plural key values being generated without communication with other communications devices;

a data encryptor for encrypting data to be transmitted based upon a current key value; and a clock for controlling the key change times, wherein the clock controls the key generation unit to generate keys sequentially at regular intervals, and wherein the clock includes a reference time input for synchronization to a reference time provided from outside the communication device.

37. A communications device according to claim 36, wherein the clock is a free running clock.

38. A communications system for secure cryptographic communications among plural devices employing cryptographic keys, comprising a plurality of communications devices for transmitting and/or receiving data, wherein each communications device comprises:

a key generation unit for generating plural key values in sequence at key change points in time based upon provided initialization data, the plural key values being generated at the communications device after receipt of the initial key value without communication with any of the other communications devices, wherein the key change points in time are nominally the same at each communications device; and at least one of a data encryptor and data decryptor for encrypting or decrypting data to be transmitted or received, respectively, by employing a current key value, wherein each data decryptor employs a plurality of sequentially generated key values for decrypting data, whereby a particular decryptor can decrypt data that was encrypted with a key value which is adjacent to the current key value at the particular decryptor, and wherein the decryptor employs the current key value, a next key value, and an immediately preceding key value for decryption, thereby permitting decryption of data that was encrypted with a key which is either just ahead or just behind the current key value of the particular decryptor so as to compensate for lack of exact synchronization between different key generation units and/or transmission delays.

39. A communications system according to claim 38, wherein each communications device include a reference time input for receiving a common timing reference for synchronizing the key generation operations of the respective key generation units.

40. A communications system according to claim 38, wherein the key change points occur periodically.

41. A communications system according to claim 38, wherein the key generation units generate sequential key values in accordance with a key generation algorithm.

42. A method for secure cryptographic communications between plural communications devices comprising the steps of:

providing initialization data to each communication device;

generating sequential key values at each communications device based upon the initialization data at nominal key change points in time without any communication between the communications devices;

encrypting data for transmission from a communications device employing a current key value at that communications device; and decrypting the received encrypted data at a communications device by concurrently employing a plurality of sequential key values generated at that communications device, wherein the plurality of sequential key values include a current key value, a preceding key value that immediately precede the current key value, and a proceeding key value immediately following the current key value at that communications device.

43. A method for secure cryptographic communications as in claim 42, further comprising the step of synchronizing the key generation operation of a communications device with a timing reference to which other communications devices are also synchronized.

44. The system for secure cryptographic communication of claim 32, wherein, in response to the flag signal, the data processor measures the offset between the first and second timing elements.

45. The method of claim 19, wherein said data decrypting sections obtain keys are successive periodic key times.

46. The method of claim 21, wherein said at least two of said plurality of keys are employed concurrently to decrypt the encrypted data.

47. A method for secure cryptographic communication between a sender location and a receiver location, the method comprising the steps of:

generating a first and second set of key change signals at said sender and receiver location, respectively;

generating a first and second set of plurality of cryptographic keys at said sender and receiver locations, respectively, wherein said first and second set of plurality of cryptographic keys are generated in sequence independently, and wherein said first and second set of plurality of cryptographic keys are generated in sequence in accordance with said first and second set of key change signals;

encrypting data using at least one key from the first set of plurality of cryptographic keys;

decrypting data using at least two keys from the second set of plurality of cryptographic keys, said at least two keys including a current-key-period decryption key and an adjacent-key-period decryption key, wherein only one of said current-key-period decryption key and said adjacent-key-period decryption key decrypts the encrypted data between key change signals; and generating a flag signal in response to an event wherein, in between key change signals, said one of said current-key-period decryption key and said adjacent-key-period decryption key ceases to decrypt the encrypted data, and the other one of said current-key-period decryption key and said adjacent-key-period decryption key begins to decrypt the encrypted data, wherein said flag signal is used to monitor the synchronization between the first and second set of key change signals.

48. The method for secure cryptographic communication of claim 47, wherein said first and second set of cryptographic keys are generated in a pseudo-random manner.

49. The system according to claim 47, further comprising the steps of:

detecting said flag signal; and causing said first and said second timing elements to synchronize in response to detecting said flag signal.

50. The system for secure cryptographic communication of claim 47, further comprising the steps of:

detecting the flag signal; and in response to detection of the flag signal, measuring the offset between the first and second set of key change signals.

* * * * *